3,092,652
PREPARATION OF ARYLDIHALOBORANES AND POLY(DIHALOBORANO) BENZENES

David R. Stern, Fullerton, Lahmer Lynds, North Hollywood, and Robert M. Washburn, Whittier, Calif., assignors to American Potash & Chemical Corporation, a corporation of Delaware
No Drawing. Filed Jan. 16, 1959, Ser. No. 787,106
19 Claims. (Cl. 260—462)

This invention relates to the preparation of aryldihaloboranes, poly(dihaloborano)benzenes (including benzenes having nuclear hydrogens replaced with other radicals), and to the preparation of the corresponding boronic and polyboronic acids and to the corresponding alkyl esters of the boronic acids.

A number of uses are known for the areneboronic acids; see, for example, the article of Beran, Pray and Bohm appearing in Mitt. Chem. Forsch. Inst., Wirtsch. Osterr, 6, 54–56 (1952), wherein a wide variety of boronic acids were tested for insecticidal activity against the granary weevil and the house fly, among other insects. Virtually all of the materials tested were found effective against these insects to a greater or lesser extent. The polyboronic acids, such as benzenediboronic acid and benzenetriboronic acid, also are effective for controlling the house fly. In various tests using a polyboronic acid, the toxic material was dissolved in 95% alcohol at a concentration of 45.4 mg. per ml. and in both contact tests, wherein the house flies were allowed to directly contact filter papers which had been treated with the toxic material in solution, and in vapor toxicity tests, 100% of the flies were found dead or moribund after a period of 24 hours.

The areneboronic acids, both the monoboronic acids and the polyboronic acids, also find use as antioxidants. They are thermally and hydrolytically stable and soluble in hydrocarbons and thus are especially suitable for use as antioxidants in petroleum oils or in other organic materials where an antioxidant is desired. For example, they may be used as antioxidants for aniline, a material used in die making, wherein they inhibit the formation of color bodies which result from oxidation.

The aryldihaloboranes and poly(dihaloborano)benzenes which are treated as intermediates here are also known materials [with the exception of those of the formula $Ar(BX_2)_3$] and various other utilities for these known materials are recognized.

It has been discovered that aryldihaloboranes and poly(dihaloborano)benzenes can be formed in high yields by a simple Friedel-Crafts type reaction between aromatic compounds and boron trihalides in the presence of an appropriate catalyst such as anhydrous aluminum chloride. The reactions can be represented by the following generalized equation:

$$ArH_n + nBX_3 \xrightarrow{catalyst} Ar(BX_2)_n + nHX$$

where $n$ is an integer of between 1 and 3, X is Cl, Br; and Ar is an aromatic nucleus. The nucleus may be substituted with various substituents such as $CH_3O$, $ClCH_2$, $C_2H_5$, etc., the only requirement being that the substituent not be so electronegative as to prevent reaction.

As shown in the examples, the molar ratio of catalyst to $BX_3$ falls within the range of 0.0374 to 0.0125.

Subsequent to the formation of the compound of the formula $Ar(BX_2)_n$, the reaction product may be hydrolyzed to form the corresponding arenemonoboronic or arenepolyboronic acid. Also, the compound of the formula $Ar(BX_2)_n$ may be treated with alcohol to form an ester of the formula $Ar[B(OR)_2]_n$, or the acid may be dehydrated to the anhydride.

As pointed out in greater detail below, mixtures of products may be prepared which have boron-containing groups substituted to greater or lesser extents on the aromatic nucleus; formation of either $Ar(BX_2)_3$ or $Ar(BX_2)_2$ or $ArBX_2$ may be encouraged by varying the mole ratio of the reactants.

One-half mole percent of catalyst is sufficient to ensure that the reaction proceeds properly and the preferred ratio is determined readily. The concentration of catalyst determines the rate of reaction rather than the end result.

Any catalyst of the Friedel-Crafts type is suitable and preferred catalysts are $AlBr_3$, $AlCl_3$, $FeCl_3$, $SnCl_4$, $BF_3$ and $ZnCl_2$. Many Friedel-Crafts type catalysts are available having varying degrees of activity and hence condensation can be moderated by the use of mild catalysts.

The control that is possible through the choice and amount of catalyst and regulation of the temperature is important in poly substitutions, for under mild conditions the entering groups tend to become oriented in ortho and para positions, whereas under forcing conditions meta orientation obtains.

The products obtained depend on concentration or mole ratio of reactants and method of addition. Slow addition of boron trihalide to an excess of aromatic material in the presence of aluminum chloride results in the formation of an aryldihaloborane. The reverse procedure, in which the aromatic material is added to a large excess of boron trihalide, results in the formation of bis(dihaloborano)benzene with small amounts of the tris and other more highly substituted materials. Intermediate ratios of reactants result in a mixture of the two primary products.

The reaction of a boron trihalide with an aromatic material is exothermic and takes place quite readily. Preferably, reactions are initiated at about 45° C. and the temperature allowed to rise to about 80° C. The higher reaction temperatures favor poly substitution and increase the speed of reaction. The reaction will proceed at about room temperature, but very slowly, while when the reaction mixture is heated above the boiling point, pressure is necessary. The reaction is most conveniently carried out at reflux temperature.

A hydrogen halide is a by-product of both the reaction and hydrolysis step. A recovery system can easily be incorporated to recycle excess reactants and to convert hydrogen halides back into the corresponding boron trihalides. The aryldihaloboranes and poly(dihaloborano)benzenes, etc., are liquids or low melting solids and can be recovered by distillation or crystallization. The hydrolysis products of the haloboranes are solids and are easily recovered by filtration. They can be purified by recrystallization from a suitable solvent. Yields as high as 93%, based on boron trihalide, may be realized provided the recovery system is sufficiently efficient. Yields of up to 40% benzenediboronic acid based on boron trihalide have been realized.

The entire group of compounds containing aryl-boron bonding is susceptible to both hydrolysis and oxidation. However, the aryldihaloboranes, unlike the alkyldihaloboranes, were found to be sufficiently stable so that standard handling techniques could be applied to the intermediates.

The practice of this process will become further apparent from the consideration of the following examples which are set forth by way of illustration.

EXAMPLE I.—BENZENEBORONIC ACID

Benzene (532 ml., 468 g., 6.0 moles) and 10 grams of aluminum chloride (0.075 mole) were placed in a 1–1 Morton flask. The temperature was raised to mild reflux (vapor 80.2° C.) and boron tribromide (190 ml., 504 g., 2.0 moles) was added via a dropping funnel over a 2-hour period. Copious evolution of hydrogen bromide (determined by infrared spectra) was immediately evident. A plot of hydrogen bromide liberated versus time was made in order to determine the reaction time. The slope or rate of formation indicated that 4–6 hours was sufficient time for mono substitution. The reaction was run for a total of 5 hours and 55 ml. (theory, 45.5 ml.) hydrogen bromide was trapped at −78° C. Actually, hydrogen bromide has considerable vapor pressure at −78° C. (387 mm. Hg) and cannot be completely recovered by condensation. A Whitmore-Lux distillation head was then placed on the reaction flask and the unreacted components were removed by distillation. The distillation was terminated at 130° C. (pot temperature) when decomposition of the crude intermediate began. Reactants were removed between 80 and 92° C. (vapor) for a total volume of 430 ml. (455 g.). The flask was cooled and the intermediate transferred to a dropping funnel. It was then added slowly (50 ml./hour) into 500 ml. of 0.2 N hydrochloric acid maintained near 0° C. with continuous agitation. After addition of 100 ml. phenyldibromoborane, solids began to appear. Upon completion of the addition, the solids were removed by filtration and appeared as small gray spheres. The dried crude product weighed 192 grams. Spectra of this material indicated practically pure benzeneboronic anhydride. The product was converted to benezeneboronic acid by extraction with ether and crystallization from water.

*Analysis.*—Calcd. for $C_6H_5B(OH)_2$: B, 8.87%; C, 59.06%; H, 5.74%; B–C/B ($HgCl_2$ decomp.) 1.00. Found: B, 9.14%; C, 61.55%; H, 5.93%; B–C/B ($HgCl_2$ decomp.) 1.00.

The analytical data indicate slight dehydration of the product to the anhydride. A portion of this material was reconverted to the anhydride by redissolving in ether and evaporating to dryness to insure complete dehydration.

*Analysis.*—Calcd. for $(C_6H_5BO)_3$: B, 10.42%; C, 69.36%; H, 4.82%; B–C/B ($HgCl_2$ decomp.) 1.00. Found: B, 10.1%; C, 68.50%; H, 5.31%.

Since the anhydride is the most stable species, it served as a basis for calculations. Calculated yield based on boron tribromide used was 93%.

EXAMPLE II.—BENZENEDIBORONIC ACID

Boron tribromide (568 ml., 1505 g., 6.0 moles) and 10 grams of anhydrous aluminum chloride were placed in a 1–1 Morton flask. The temperature was raised to mild reflux and benzene (177 ml., 156 g., 2.0 moles) was added slowly over a 2-hour period via a dropping funnel. The mixture was gently heated under refluxing for 24 hours, attaining a final vapor temperature of 91° C., indicating benzene had been essentially consumed. The reaction duration was increased to favor poly substitution. Vigorous agitation was used at all times. During the course of reaction, 79 ml. (theory for disubstitution, 98 ml.) of hydrogen bromide was collected at −78° C., and provided a good indication that poly substitution had taken place. Excess reactants were separated by distillation as before. The distillation was terminated at 125° C. (pot temperature) when it became evident that decomposition of the intermediate was occurring. Reactants were removed between 88 and 97° C. (vapor) for a total volume of 285 ml. (694 g.). The reaction mixture was cooled and transferred to a dropping funnel and then added slowly to 500 ml. chilled 0.2 N hydrochloric acid. Addition rate of 60 drops per minute produced strong hydrogen bromide evolution and vapor temperature of 84° C. The addition rate was reduced to 32 drops per minute, and vigorous agitation was employed at all times. The mixture was then filtered as before, yielding 150 grams crude material. The crude product was extracted with 400 ml. ether. The solids were dissolved in 400 ml. of hot water, the resulting aqueous solution filtered hot, and the filtrate was allowed to cool. Four crops of crystals were obtained in the course of successive work-ups for a total of 113 grams. The ether extract was reduced to 100 ml. and an equal volume of distilled water was added. More ether was removed until only a small layer remained containing some solids. It was then filtered hot and allowed to cool. Crystals formed from the filtrate which weighed 16.0 grams. A yield of 40.6% 1,3-benzenediboronic acid was obtained.

*Analysis.*—Calcd. for $C_6H_4[B(OH)_2]_2$: B, 13.04%; C, 43.48%; H, 4.83%. Found: B, 12.4%; C, 42.0%; H, 4.81.

Benzenediboronic acids are not easily dehydrated even at fairly high temperatures and can be readily handled at room temperature without special techniques.

Various additional reactions were carried out wherein different aromatic compounds were allowed to react with boron tribromide. In each instance, the boron tribromide, the aromatic compound, and the aluminum chloride catalyst were heated under reflux. The reaction followed; hydrogen bromide was liberated. The ratio of —$BBr_2$:arene was adjusted to approximately 1.0 where a predominantly monoboronic acid product was desired and was adjusted closer to 2.0 where a predominantly diboronic acid product was desired. Where significant quantities of a triboronic acid are desired, the ratio must be adjusted to at least 3.0.

The data set forth in the table below indicate that a mixture of mono- and diboronic acids was formed in the case of the toluene and biphenyl and only monoboronic acid was formed in the case of the chlorobenzene and naphthalene. The quantities, ratios, reagents, etc., used are set forth in Table A below.

Table A

| Run No. | Reactant | $AlCl_3$ Catalyst, Grams | Reactant, Moles | Halide, Moles | Time Heating, Hrs. | Obsv. Ratio $BBr_2$:Arene |
|---|---|---|---|---|---|---|
| 1 | ⌬—CH₃ | 1.6 | 0.166 | 0.5 | 21 | 1.23 |
| 2 | ⌬—Cl | 1.6 | 0.166 | 0.5 | 21 | 0.771 |
| 3 | ⌬—⌬ | 1.6 | 0.166 | 0.5 | 20 | 1.78 |
| 4 | ⌬⌬ | 1.6 | 0.166 | 0.5 | 20 | 1.06 |

As is seen from the examples above, the aryl-B compounds may readily be recovered by hydrolysis of the intermediate aryldihaloborane or poly(dihaloborano)-benzene (or nuclear-substituted benzene).

The dihaloborano materials may also be distilled off and recovered as such, or esters may be formed from the acids described in the examples above and these may be recovered by distillation.

The preparation of a typical aryldihaloborane and the recovery thereof by distillation is set forth in Example IV below.

The intermediate aryldihaloboranes and poly(dihaloborano)benzenes may also be treated with alcohol and water to form the monoboronic and polyboronic acids. The alcohol is added slowly to the intermediate and the resulting ester is subsequently hydrolyzed so as to form the acid. Alternatively, the ester may be used as such as an antioxidant in the same manner as the corresponding acid. An example showing the esterification of one of the intermediates is set forth below as Example III.

EXAMPLE III.—PREPARATION OF DIMETHYL BENZENEBORONATE

Phenyldibromoborane (20.0 g., 0.08 mole) was dissolved in 15 ml. of anhydrous Skellysolve F (dried over calcium hydroxide) and added slowly to an agitated mixture of absolute methanol (in 5.1 g., 0.16 mole) in 15 ml. anhydrous Skellysolve F. The temperature was maintained at 4° C. with an ice-salt-bath. Solvent was removed under vacuum at 20° C. The material which remained was distilled ($b_{17-22}$ 86–91° C., 12.1 g., 95% yield).

This reaction can be performed in almost any inert solvent or in an excess of the alcohol.

Obviously, many modifications and variations of this invention may be made without departing from the spirit and scope thereof and only such limitations should be imposed as are indicated in the appended claims.

We claim:

1. A process for the preparation of compounds of the general formula $Ar(BX_2)_n$ wherein $n$ is an integer between 1 and 3, X is halogen and Ar is selected from the class consisting of aryl and haloaryl comprising: forming a mixture of a Friedel-Crafts catalyst and a boron trihalide of the general formula $BX_3$, the molar ratio of said catalyst to said $BX_3$ being within the range 0.0374–0.0125, adding thereto a quantity of the compound of the formula $ArH_n$, heating the mixture so formed whereby to react said $BX_3$ and $ArH_n$ to form said $Ar(BX_2)_n$ and gaseous HX and withdrawing said gaseous HX therefrom as said HX is formed.

2. The process of claim 1 wherein Ar is $C_6H_5$, $n$ is 1 and X is Cl.
3. The process of claim 1 wherein Ar is $C_6H_5$, $n$ is 1 and X is Br.
4. The process of claim 1 wherein $ArH_n$ is $C_6H_5CH_3$.
5. The process of claim 1 wherein $ArH_n$ is $C_6H_5C_6H_5$.
6. The process of claim 1 wherein $ArH_n$ is $C_6H_5Cl$.
7. The process of claim 1 wherein $ArH_n$ is naphthalene.
8. The process of claim 1 wherein $ArH_n$ is $C_6H_6$.
9. The process of claim 1 wherein Ar is $C_6H_4$, $n$ is 2 and X is Cl.
10. The process of claim 1 wherein Ar is $C_6H_4$, $n$ is 2 and X is Br.
11. The process of claim 1 wherein the $Ar(BX_2)_n$ is thereafter hydrolyzed to $Ar[B(OH)_2]_n$.
12. The process of claim 1 wherein the Friedel-Crafts catalyst is aluminum trichloride.
13. The process of claim 1 wherein the Friedel-Crafts catalyst is aluminum tribromide.
14. The process of claim 1 wherein the Friedel-Crafts catalyst is ferric chloride.
15. The process of claim 1 wherein the Friedel-Crafts catalyst is zinc chloride.
16. The process of claim 1 wherein the $Ar(BX_2)_n$ so formed is reacted with a lower alkyl alcohol of the formula ROH where R is lower alkyl to form $Ar[B(OR)_2]_n$.
17. The process of claim 11 wherein ROH is $CH_3OH$.
18. The process of claim 11 wherein X is Cl.
19. The process of claim 11 wherein X is Br.

References Cited in the file of this patent

UNITED STATES PATENTS 2,900,414    Muetterties _____ Aug. 18, 1959

OTHER REFERENCES

Torssell: Acta Chem. Scan., vol. 8, pp. 1779–86 (1954).
Nielsen et al.: J. Am. Chem. Soc., vol. 79, pp. 3081–4 (1957).
Muetterties: J. Am. Chem. Soc., vol. 81, p. 2807, May 20, 1959.